United States Patent [19]

Tetsuo

[11] Patent Number: 4,476,967
[45] Date of Patent: Oct. 16, 1984

[54] HYDRAULIC DAMPER

[75] Inventor: Kato Tetsuo, Kanagawa, Japan

[73] Assignee: Tokico Ltd., Kanagawa, Japan

[21] Appl. No.: 535,532

[22] Filed: Sep. 26, 1983

Related U.S. Application Data

[63] Continuation of Ser. No. 281,210, Jul. 6, 1981, abandoned.

[30] Foreign Application Priority Data

Jul. 4, 1980 [JP] Japan .............................. 55-94929[U]
Jul. 4, 1980 [JP] Japan .............................. 55-94930[U]

[51] Int. Cl.³ .............................................. F16F 9/44
[52] U.S. Cl. ..................................... 188/319; 138/45;
188/299; 251/284
[58] Field of Search ............... 188/278, 299, 300, 319;
267/64.12, 127; 138/45, 46; 251/215, 227, 284

[56] References Cited

U.S. PATENT DOCUMENTS

| | | | |
|---|---|---|---|
| 1,628,566 | 5/1927 | Williams | 251/284 X |
| 1,774,994 | 9/1930 | Pfoutz | 251/284 X |
| 1,883,292 | 10/1932 | Jackson | 188/319 X |
| 2,032,189 | 2/1936 | Stilling | 188/319 X |
| 2,064,832 | 12/1936 | Hollander | 188/319 X |
| 2,654,562 | 10/1953 | Foster | 251/284 X |
| 2,745,517 | 5/1956 | Zook | 188/319 |
| 2,780,321 | 2/1957 | Sturari | 188/319 |
| 2,836,264 | 5/1958 | Groen | 188/319 X |
| 2,919,101 | 12/1959 | Black | 251/284 X |
| 3,145,588 | 8/1964 | King | 188/319 X |
| 3,351,160 | 11/1967 | Dekoning et al. | 188/319 |
| 3,848,710 | 11/1974 | Thompson et al. | 188/280 |
| 4,337,850 | 7/1982 | Shimokura | 188/319 |

FOREIGN PATENT DOCUMENTS

| | | | |
|---|---|---|---|
| 50-85692 | 7/1975 | Japan . | |
| 53-26550 | 7/1978 | Japan . | |
| 465335 | 12/1968 | Switzerland | 188/319 |
| 565630 | 11/1944 | United Kingdom | 188/319 |

Primary Examiner—George E. A. Halvosa
Attorney, Agent, or Firm—Wenderoth, Lind & Ponack

[57] ABSTRACT

A hydraulic damper includes a cylinder receiving hydraulic liquid therein, a piston working in the cylinder and partitioning the interior thereof into two chambers, a piston rod secured to the piston and extending through one of the two chambers to the outside of the damper and having an axial bore extending therethrough, a valve mechanism mounted on the piston, an elongated adjusting rod axially displaceably disposed in the piston rod with the inner end thereof cooperating with an orifice member which is mounted on the piston rod, and a by-pass passage including the axial bore in the piston rod and an orifice of the orifice member and connecting the two chambers. The orifice member is axially adjustably mounted on the piston rod such that the location of the orifice member with respect to the piston rod can be adjusted to abut with the adjusting rod when the adjusting rod is at an innermost position.

5 Claims, 5 Drawing Figures

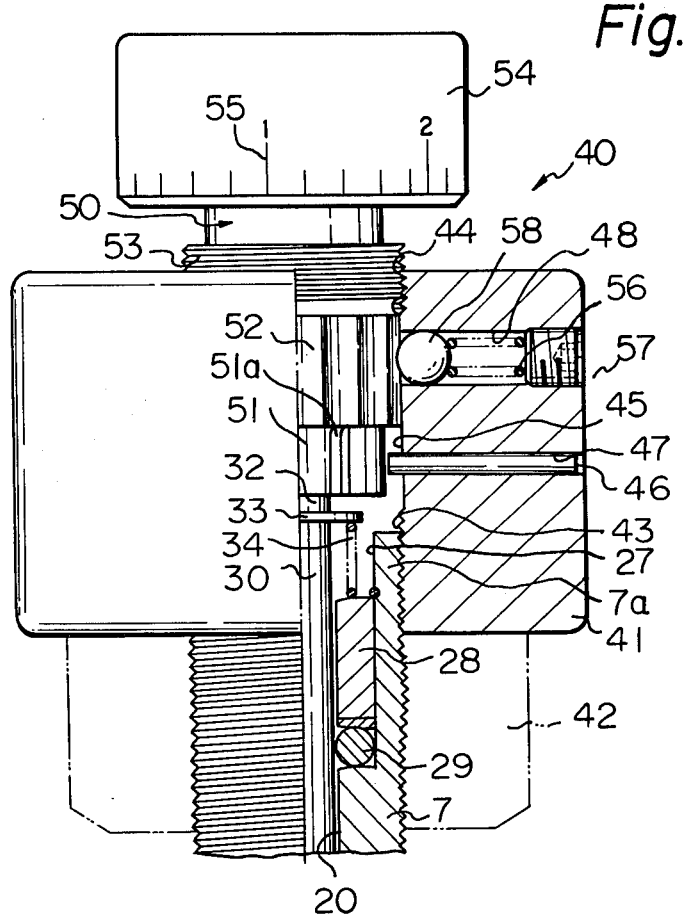
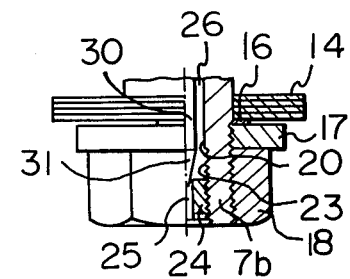
Fig. 2
Fig. 3

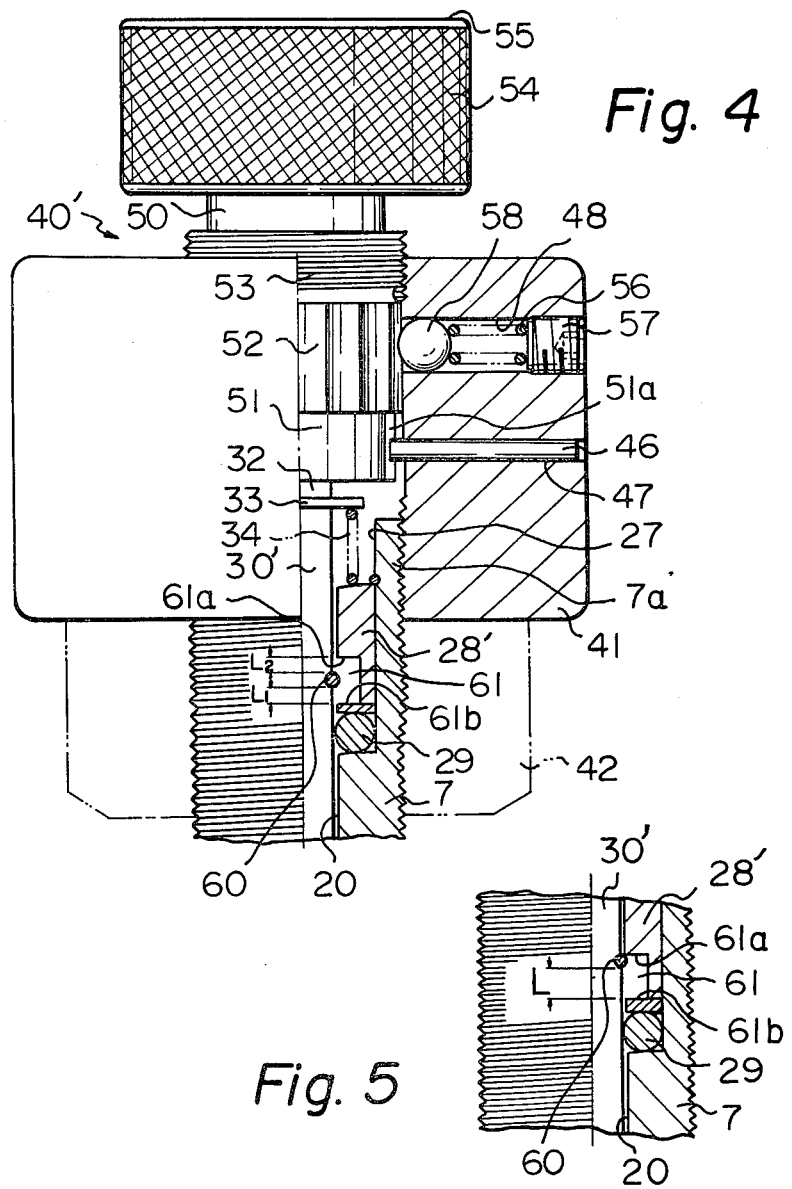

HYDRAULIC DAMPER

This application is a continuation of now abandoned application Ser. No. 281,210, filed July 6, 1981, now abandoned.

BACKGROUND OF THE INVENTION

This invention relates to hydraulic dampers and, particularly to hydraulic dampers of the type including a cylinder receiving hydraulic liquid therein, a piston working in the cylinder and partitioning the interior of the cylinder into two chambers, a piston rod secured to the piston and extending through one of the two chambers to the outside of the damper, an axial bore extending through the piston rod, an elongated adjusting rod axially displaceably disposed in the bore of the piston rod with the inner end thereof cooperating with an orifice member which is mounted on the inner end of the piston rod, and a passage defined by the axial bore in the piston rod for connecting the two chambers through a radial bore in the piston rod which opens to the one chamber and through an orifice of the orifice member which opens to the other chamber.

The adjusting rod can be operated from the outside of the damper whereby the liquid flow passing through the passage can be adjusted. Conventionally, a valve mechanism is incorporated in the piston, and the liquid flow flowing through the passage in the piston rod acts as a by-pass flow against the oil flow through the valve mechanism whereby the damping force of the damper can be adjusted by operating the adjusting rod from the outside of the damper.

A hydraulic damper of the type aforementioned is disclosed in Japanese Utility Model Publication No. 53-26550 and Japanese Utility Model Disclosure (Kokai) No. 50-85962.

However, there are shortcomings in the prior art hydraulic dampers of the type aforementioned in that, due to manufacturing tolerances with respect to the length of the piston rod and the adjusting rod, the configuration of the orifice member and the adjusting rod, and the location of the orifice member with respect to the piston rod, it is very difficult to properly locate the adjusting rod with respect to the orifice member, and in that it is difficult to suitably determine the range of the adjustment on the damping force with respect to the range of the vertical displacement of the adjusting rod.

Conventionally, an actuating or adjusting mechanism is mounted on the piston rod for operating the adjusting rod from the outside. In such case, the stroke of the adjusting mechanism is required to correspond with the stroke of the adjusting rod such that the adjusting rod can reliably displace with respect to the orifice member between a minimum flow or the zero flow condition and a predetermined maximum flow condition in response to the stroke of the adjusting mechanism. Otherwise, the adjusting rod would be deformed in receiving excessive force from the adjusting mechanism, or a desired range of adjustment can not be attained.

SUMMARY OF THE INVENTION

An object of the invention is to preclude the aforesaid shortcomings and, according to the invention, the orifice member in the hydraulic damper of the type aforementioned is axially adjustably mounted on the piston rod such that the axial location of the orifice member with respect to the piston rod can be adjusted to abut with the adjusting rod when the adjusting rod is at an innermost position.

Preferably, the orifice member is screw-threadingly mounted on the piston rod whereby the axial location of the orifice member with respect to the piston rod can easily be adjusted and, further, the orifice member can easily be retained at the adjusted location by such as caulking.

According to one aspect of the invention, the adjusting rod is retained on the piston rod so as to axially displace relative to the piston rod by a predetermined amount, and is normally biased outwardly by a spring. The adjusting mechanism having a predetermined stroke, which is smaller than the aforementioned amount, is mounted on outer end of the piston rod to act on the adjusting rod. Thus, the displacement of the adjusting rod faithfully corresponds to the movement of such as a dial member of the adjusting mechanism, and it is possible to prevent difficulties such as the deformation of the adjusting rod which would be caused by an excessive stroke of the adjusting mechanism.

BRIEF DESCRIPTION OF THE DRAWINGS

The invention will hereinafter be explained in detail with reference to the attached drawings exemplifying preferred embodiments of the invention, and in which:

FIG. 2 is a partial enlarged sectional view of the upper end portion of FIG. 1;

FIG. 3 is a partial enlarged sectional view of an adjusting valve mechanism of FIG. 1;

FIG. 4 is a view similar to FIG. 2 but showing a modified form; and

FIG. 5 is a partial view of FIG. 4 with parts being positioned at a different relative position.

DETAILED DESCRIPTION OF THE PREFERRED EMBODIMENT

Figure 1:
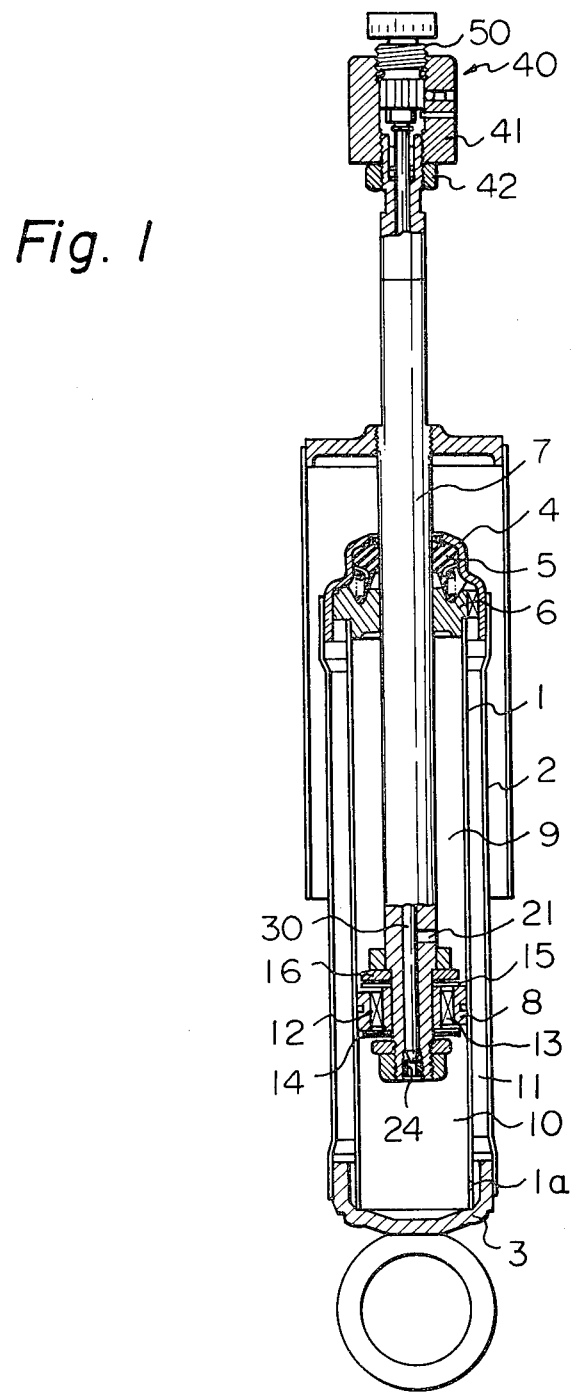
FIG. 1 is a vertical sectional view of a hydraulic damper according to the invention.

The hydraulic damper shown in FIGS. 1–3 comprises coaxial inner and outer tubes 1 and 2 with opposite ends thereof being secured respectively to caps 3 and 4. The inner tube 1 constitutes a cylinder according to the invention. A hollow piston rod 7 slidably extends through a seal ring 5 and a rod guide 6 which are mounted respectively in the cap 4. A piston 8 connected to the inner end of the piston rod 7 works in the inner tube 1. The interior of the inner tube 1 is partitioned into two oil chambers 9 and 10, and an annular space 11 defined between inner and outer tubes 1 and 2 receives therein oil and gas and is communicated with the oil chamber 10 through a restricted passage or an orifice 1a to act as a reservoir chamber. There are provided in the piston 8 two sets of axial bores 12 and 13 which cooperate respectively with valve disc 14 and 15. The upper ends of the bores 12 communicate permanently with the oil chamber 9 and the lower ends of the bores 12 are normally closed by the valve disc 14, while the lower ends of the bores 13 communicate permanently with the oil chamber 10 and the upper ends of the bores 13 are normally closed by the valve disc 15. The valve disc 14 generates a damping force when the piston 8 moves upward or in the extending stroke of the damper, and the valve disc 15 generates a damping force when the piston 8 moves downward or in the contracting stroke of the damper.

The piston rod 7 has a bore 20 extending coaxially therethrough. An adjusting rod 30 loosely extends through the bore 20 to define therebetween an annular passage 26. The upper end of the passage 26 is sealed by an O-ring 29, the lower end thereof is adapted to communicate with the oil chamber 10 through an orifice 25 of an orifice member 24, and the intermediate portion of the passage 26 is connected permanently with the oil chamber 9 through a radial bore 21 in the piston rod 7. The inner end 31 of the adjusting rod is tapered to cooperate with the orifice 25, and the orifice member 24 is threadingly mounted on the inner end 76 of the piston rod 7. Thus, the oil flow passing through the passage 26 can be adjusted by axially displacing the adjusting rod 30 with respect to the piston rod 7.

A mechanism 40 for adjusting the axial position of the adjusting rod 30 is provided on the upper end 7a of the piston rod 7. The upper end of the bore 20 is counterbored to define a bore 27 in which there are provided the O-ring 29 and an annular guide 28. A retaining ring 33 is mounted on the upper end 32 of the adjusting rod 30, and a coil spring 34 acts between the retaining ring 33 and the guide 28 to upwardly bias the adjusting rod 30. The adjusting mechanism 40 includes a casing 41 which is threaded to the upper end 7a of the piston rod and is secured by a lock nut 42. A rotatable member 50 having a dial member 54 is threadingly mounted on the casing 41 and the inner end thereof abuts with the upper end of the adjusting rod 30. The inner end portion 51 of the rotatable member 50 is generally cylindrical and has an axially extending ridge 51a formed on the circumference of the cylindrical surface to cooperate with a rod 46 which is mounted in a radial bore 47 in the casing 41 and projects from the inner surface 45 of the casing. The rod 46 acts as a stop preventing one full turn of the rotatable member 50 with respect to the casing 41. The rotatable member 50 further includes a portion 52 having a plurality of axially extending ridges to define a serration, gear or polygon like cross-section. The portion 52 cooperates with a ball 58 which is received in a radial bore 48 in the casing 41 and receives the spring force of a coil spring 56 to constitute a click stop or detent against the rotation of the rotatable member 50. A scale 55 is provided on the outer circumference of the dial member 54 for visibly indicating the adjusted position of the adjusting rod 30.

In assembling the adjusting mechanism 40 on the piston rod 7, the dial member 54 is firstly rotated to the outermost position, in the illustrated embodiment in the counterclockwise direction, until the stop 46 abuts with the axial ridge 51a. At that condition, the casing 41 of the mechanism 40 is threadingly mounted on the piston rod 7 until the inner end of the rotatable member 50 abuts with the outer end of the adjusting rod 30 and the spring 34 is compressed by a small amount. The lock nut 42 is tightened whereby the casing 41 is secured to the piston rod 7. Thereafter, the dial member 54 is rotated in the clockwise direction to the innermost position with the stop 46 again abutting with the axial ridge 51a. The orifice member 24 is screwed into the bore 20 of the piston rod 7 until the edge defining the orifice 25 tightly engages with the inner end 31 of the adjusting rod 30. The effective area of the passage connecting chambers 9 and 10 has been set to a minimum. The orifice member 24 is secured to the piston rod 7 by such as caulking or the like. The piston 8 is mounted in the cylinder 1, and suitable amounts of oil and gas are filled into the damper.

The damping force of the damper can effectively be adjusted from the outside of the damper by rotating the dial member 54 which makes it possible to change the oil flow passing through the orifice 25. Further, a desired range of adjustment can reliably be attained irrespective of variations in the dimensions of parts such as the piston rod, the adjusting rod and the orifice member due to manufacturing tolerances.

In this embodiment, the orifice member threadingly engages with the piston rod, however, the threading engagement therebetween may be replaced by a sliding engagement and a securing device such as a pin. Further, the adjusting mechanism 40 may comprise a cam.

FIGS. 4 and 5 show another embodiment of the invention wherein upward and downward movement of the adjusting rod 30 with respect to the piston rod 7 is restricted by stops. Namely, the annular guide 28 in FIG. 2 is modified to have an annular recess 61 in the radially inner circumference thereof which defines an upper stop 61a and a lower stop 61b. The lower stop 61b may preferably be defined as the upper surface of an annular washer which retains the O-ring 29 and abuts with the axially inner end of guide 28', the annular washer and O-ring constituting a seal means between the piston rod and adjusting rod. A locating ring 60 is mounted in an annular groove formed in the outer circumference of the adjusting rod 30' so that a possible full stroke L (FIG. 5) of the adjusting rod 30' is defined. The length L is determined to be larger than the possible adjusting length of the adjusting mechanism 40' which is defined by the axial displacement of the rotatable member 50 with respect to the casing 41 between positions wherein the rod 46 engages with respective sides of the axial ridge 51a.

In assembling the damper, the adjusting rod 30' is firstly assembled with the piston rod 7. The adjusting rod 30' takes the uppermost position as shown in FIG. 5 due to the spring 34.

Secondly, the orifice member 24 is threaded into the lower end of the bore 20 of the piston rod until the edge defining the orifice 25 of the orifice member 24 engages with the inner end 31 of the adjusting member 30' closing the valve. Thereafter, the orifice member 24 is unthreaded from the bore 20 by an axial distance equal to or larger than the possible adjusting length of the adjusting mechanism 40'. The orifice member 24 is secured at that position by such as caulking.

The piston rod 7 and the cylinder 1 are assembled according to a conventional assembling process of the hydraulic damper, and a suitable amount of gas under pressure is filled into the reservoir chamber.

Finally, the adjusting mechanism 40' is assembled with the piston rod 7, with the rotatable member 50 being located at the innermost position, until the inner end 31 of the adjusting rod 30' engages with the orifice member and closes the orifice 25. The lock nut 42 is tightened so as to secure the mechanism 40' to the piston rod 7.

Since the adjusting length of the adjusting mechanism 40' is smaller than the length L of maximum possible displacement of the adjusting rod 30', the adjusting rod 30' can follow the axial movement of the rotatable member 50, and a desired range of adjustment can be attained. Therefore, the initial setting of the damping force can easily and reliably be established, irrespective of variations in the dimensions of parts such as the piston rod 7, the adjusting rod 30', the orifice member 24 or the like which inevitably occur due to manufacturing tolerances.

It is described that the initial setting of the range of the adjustment is performed such that the minimum rate of the flow through the orifice 25 is zero, however, the range of the adjustment need not necessarily be determined to have a minimum rate of zero.

As described heretofore in detail, the hydraulic damper according to the invention comprises an adjusting rod slidably disposed in a hollow piston rod and an orifice member cooperating with the inner end of the adjusting rod so as to define an adjustable orifice, and the orifice member is displaceably provided in the piston rod. Thus, the position of the orifice member in the piston rod can easily be adjusted such that the minimum area of an adjustable area is zero when the adjusting rod takes an innermost position in the piston rod, irrespective of variations of dimensions of parts such as the adjusting rod and the piston rod which would be caused due to manufacturing tolerances.

Further, according to the embodiment of FIGS. 4 and 5, the length of possible displacement of the adjusting rod 30' with respect to the piston rod 7 is larger than the length of possible axial displacement of the rotatable member 50 in the direction of the axis and with respect to the casing 41, and the orifice member 24 is adjustably mounted on the piston rod.

Thus, irrespective of variations in the dimensions of parts such as the adjusting rod 30', the piston rod 7 and the rotatable member 50 due to manufacturing tolerances, the adjustment or setting of the clearance between the inner end 31 of the adjusting rod 30' and the orifice 25 can reliably be performed. Therefore, the adjustment of the damping force of the damper can reliably and easily be performed on the basis of mass production.

What is claimed is:

1. A hydraulic damper comprising:
   a cylinder receiving therein hydraulic liquid;
   a piston movable within said cylinder and partitioning the interior thereof into first and second liquid filled chambers;
   a piston rod extending through said first chamber and having an inner end secured to said piston and an outer end positioned exteriorly of said cylinder, said piston rod having an axial bore extending therethrough, said outer end having an interior counterbore receiving therein a seal means;
   an elongated adjusting rod positioned within said bore in said piston rod and defining therewith a passage, said adjusting rod contacting said seal means;
   a radial bore in said piston rod connecting said passage to said first chamber;
   an orifice member mounted on said inner end of said piston rod, said orifice member having therethrough an orifice connecting said passage to said second chamber;
   said adjusting rod having an inner end cooperating with said orifice member to define the size of said orifice;
   means, axially adjustably mounted on said outer end of said piston rod, for moving said adjusting rod axially within said bore, and thereby adjusting the size of said orifice;
   an annular guide positioned within said counterbore directly, biasingly engaging said seal means, said annular guide having in an inner circumference thereof an annular recess cooperating with said seal means to define first and second axially spaced stops; and
   a third stop on said adjusting rod for contact with said first and second stops to define maximum outer and inner positions, respectively, of said adjusting rod, thereby to define maximum and minimum sizes, respectively, of said orifice, and to define a maximum range of possible axial movement of said adjusting rod with respect to said piston rod.

2. A damper as claimed in claim 1, further comprising first and second bores through said piston, and first and second valve discs cooperable with said first and second bores, respectively, to damp extending and contracting movements, respectively, of said piston within said cylinder.

3. A damper as claimed in claim 1, wherein said moving means comprises a casing axially adjustably mounted on said outer end of said piston rod, a rotatable member threaded into said casing and having an inner portion in abutment with an outer end of said adjusting rod, said rotatable member being axially movable upon rotation thereof.

4. A damper as claimed in claim 3, further comprising means on said casing and said rotatable member for limiting the extent of rotation of said rotatable member with respect to said casing and thus the actual extent of axial movement of said adjusting rod with respect to said piston rod, said actual extent being less than said maximum range.

5. A damper as claimed in claim 1, wherein said orifice member is threadably connected to said inner end of said piston rod.

* * * * *